United States Patent [19]

Frusztajer et al.

[11] 4,170,739
[45] Oct. 9, 1979

[54] APPARATUS AND METHOD FOR SUPPLYING DIRECT CURRENT WITH SUPERIMPOSED ALTERNATING CURRENT

[76] Inventors: Boruch B. Frusztajer, 15 Oakland St., Lexington, Mass. 02173; Moisey M. Lerner, 1788 Beacon St., Brookline, Mass. 02146

[21] Appl. No.: 864,001

[22] Filed: Dec. 23, 1977

[51] Int. Cl.² .............................................. H02J 5/00
[52] U.S. Cl. ........................................ 307/2; 363/100
[58] Field of Search .................... 323/48, 43.5; 307/1, 307/4, 7, 22, 2, 56, 3, 5, 26; 363/100, 101, 35, 126, 142, 143

[56] References Cited

U.S. PATENT DOCUMENTS

| Re. 14,752 | 11/1919 | Arnold | 307/2 X |
|---|---|---|---|
| 2,546,011 | 3/1951 | Morrison | 323/43.5 |
| 3,042,592 | 7/1962 | Schaer | 204/51 |
| 3,276,976 | 10/1966 | Juliard | 204/43 |
| 3,515,890 | 6/1970 | Kohashi et al. | 307/7 X |
| 3,597,339 | 8/1971 | Newman et al. | 204/58 |
| 3,716,464 | 2/1973 | Kovac et al. | 204/43 |
| 4,026,781 | 5/1977 | Newman et al. | 204/228 |
| 4,046,649 | 9/1977 | Elco et al. | 204/58 |

*Primary Examiner*—L. T. Hix
*Assistant Examiner*—James L. Dwyer
*Attorney, Agent, or Firm*—Wolf, Greenfield & Sacks

[57] ABSTRACT

A power supply and a method for providing in a convenient and inexpensive way an unlimited range of direct currents with superimposed alternating sinusoidal or non-sinusoidal currents to a single load or to a number of loads in parallel. A novel power supply derived from a conventional one by purposely unbalancing AC potentials of load terminals so that an additional AC voltage drop appears across the load. This unbalancing is accomplished through changing AC potentials of one or both lead terminals by connecting one of the terminals to different points along a special unbalancing transformer winding and/or by connecting capacitors between a load terminal and different points of this unbalancing winding.

17 Claims, 12 Drawing Figures

4,170,739

APPARATUS AND METHOD FOR SUPPLYING DIRECT CURRENT WITH SUPERIMPOSED ALTERNATING CURRENT

CROSS REFERENCE TO RELATED DISCLOSURE DOCUMENT

This application is based on a Disclosure Document No. 051309 filed on Aug. 2, 1976 in the U.S. Patent and Trademark Office under "Disclosure Document Program".

FIELD OF THE INVENTION

This invention relates to supplying an unlimited range of direct currents with superimposed sinusoidal and non-sinusoidal alternating currents.

BACKGROUND OF THE INVENTION

There are a number of methods for providing direct current (DC) with a superimposed alternating current (AC). In each of these methods it is necessary to provide isolation between the DC and AC sources. A typical method of such decoupling is illustrated by a diagram in FIG. 1. An inductance (3) blocks the flow of alternating current into a DC source (1) while a capacitor (4) prevents an AC source (3) from short circuiting the DC power supply. A power supply of this type which provides an AC current superimposed on DC current to a load (5), however, becomes unwidely in applications where large currents (of the order of thousands of amperes) are required as in the case of some electrochemical installations. In such cases the values of inductance (3) and capacitance (4) become quite largely and prohibitively expensive.

A method that provides a partial solution to these problems is illustrated by a diagram in FIG. 2. Alternating current is provided by a transformer (11) with a center tap (12). A DC power source (13) is connected between the center tap (12) on the transformer and the common point (14) of two loads (15 and 16). If the loads are identical, then AC voltage across the DC supply (13) is zero and no inductance is required to prevent the alternating current from flowing through the DC source. Also no capacitor is required in this circuit.

The main disadvantage of this approach is the requirement that the two loads be identical. The need for balanced loads creates a number of difficulties in practical applications and has the effect of increasing the cost of industrial processes which require the use of such supplies.

DESCRIPTION OF THE DRAWINGS

The invention will be more readily understood from the following detailed description taken in conjunction with the drawings in which.

SUMMARY OF THE INVENTION

Figure 1:
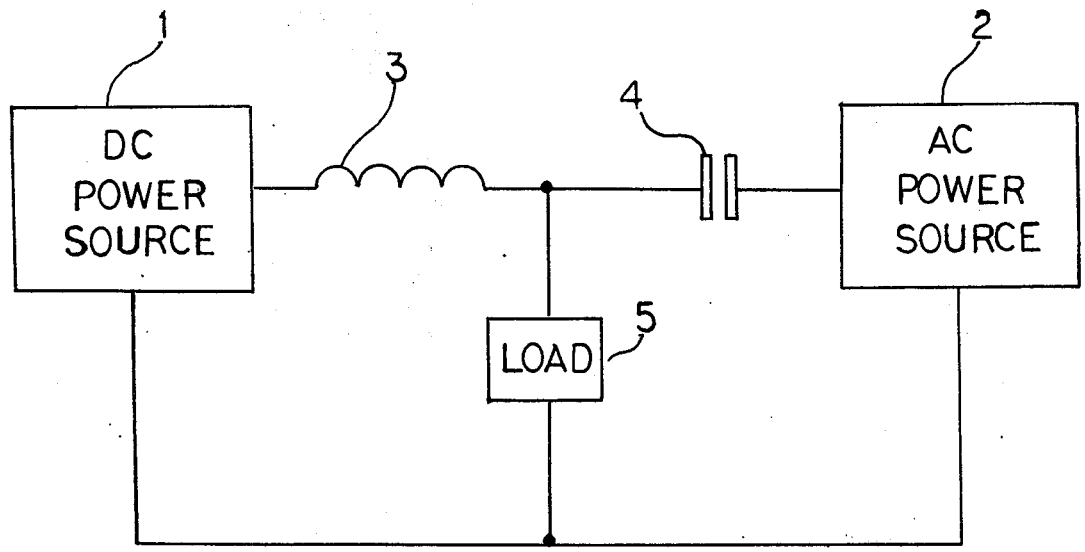
FIG. 1 is a diagrammatic representation of an example of prior art and shows separate DC and AC supplies.
Figure 2:
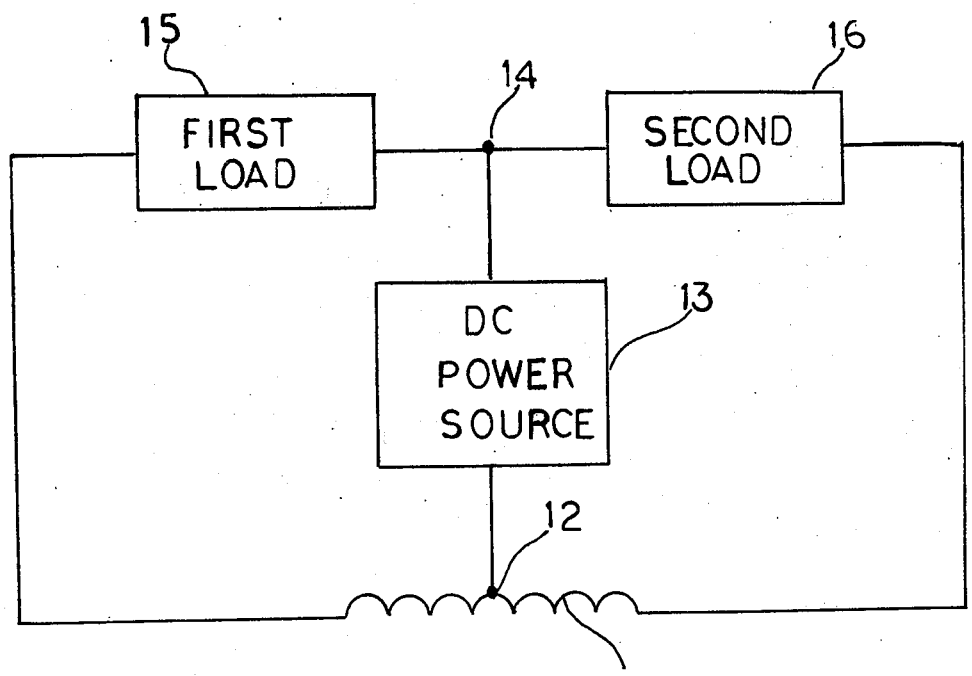
FIG. 2 is a diagrammatic representation of another example of prior art and shows a DC supply with a center tapped secondary transformer winding.

In brief, the present invention overcomes most of the problems encountered in the existing methods for supplying direct current with a superimposed alternating current. The new power supply does not use blocking inductive elements, requires no blocking capacitors and can work with single loads. For these reasons the supply provides a convenient and inexpensive method and system of generating an almost unlimited range of currents from very small to extremely large values.

In all conventional rectifier circuits one end of a load (which will be referred to henceforth as the first load terminal) is essentially connected to a rectifier circuit element or to a common point of several such elements. The other end of the load (which will be referred to henceforth as the second load terminal) is connected to a transformer winding or to another rectifier circuit element or to another common point of several such elements. In the case where a filter capacitor is connected across the load, the filter capacitor terminal which is connected to the first load terminal is designated "the first capacitor terminal", and the capacitor terminal connected to the second load terminal is designated "the second capacitor terminal."

A conventional rectifier circuit is designed to have AC potential difference between the first and second load terminals equal or nearly equal to zero. We will consider this case as one when AC potentials of the load terminals are balanced. In a full-wave center tapped rectifier, for example, balancing is achieved by connecting the second load terminal and the second capacitor terminal to the center tap of the transformer.

According to the invention, superposition of AC voltage on DC voltage is obtained through purposely unbalancing AC potentials of the load terminals by changing AC potential of the first load terminal and/or of the second load terminal so that an additional difference between these potentials will appear across the load. This change in AC potentials may or may not be accompanied by a change in DC potentials of the load terminals depending on the method used for varying the AC potentials.

If the second load terminal is connected to the center tap of the transformer winding, the AC potential of only this terminal may be changed, and subsequently the unbalancing will follow, by disconnecting the terminal from the center tap and connecting said terminal to other points along the winding. A transformer winding which is used for "unbalancing" will hereinafter be referred to as the "unbalancing winding." The position of capacitors initially shunting the load should remain unaltered; i.e., the capacitor should remain connected between the first load terminal and the center tap of the transformer in this case. No change of DC voltage across the load will be observed here since the AC potential of the first load terminal remains unchanged.

A change in AC potential of only the first load terminal may be accomplished by connecting one or more coupling capacitors between the first load terminal and different points along the unbalancing winding. These capacitors may initially shunt the load or they may be specially added to change the potential of the first load terminal. Since the AC potential of the first load terminal changes, the AC voltage across the rectifier elements also changes. This process in turn alters the magnitude of the rectified DC voltage.

The same method may be used to change the AC potential of the second load terminal when this terminal is connected to a common point of several (at least one) rectifier circuit elements. It is understood that AC and DC potentials of both load terminals may be changed simultaneously to obtain the desired value of AC and DC voltages across the load.

If the input voltage of the new power supply is sinusoidal and capacitors used in the circuit are big enough, the waveform of the AC component across the load is sinusoidal too. This waveform will vary, depending on the waveform of the input voltage or on the magnitude of capacitors used. Also, the waveform of the AC component may be changed with the help of thyristors used as rectifier circuit elements.

A non-sinusoidal AC waveform may also be acquired even when the capacitors in the circuit are big enough and normally provide sinusoidal waveform. The non-sinusoidal waveform in this case is formed by introducing another non-linear element into the circuit (the first non-linear element being diodes or thyristors). This non-linear circuit element may be, for example, a saturable core reactor used for voltage control in the primary of the transformer. Likewise semiconductor controlled rectifiers may be used at the input of the system for voltage control providing non-sinusoidal waveform of AC component across the load.

The new method of superimposing alternating circuit on direct current provides an unlimited ratio of AC to DC voltage from zero to infinity.

The invented method and system are valid for a rectifier circuit with an arbitrary number of phases and arbitrary number of rectifier circuit elements.

If the use of the invented method results in the appearance of an excessive magnetic flux in the transformer, various existing flux compensating methods can be used. These methods may include sectionalizing of the transformer windings or providing an additional compensating winding, etc.

The new power supply may be considered as a source of a modulated voltage, wherein the DC voltage is a carrier and the sinusoidal or non-sinusoidal component is a modulating voltage. The voltage instead of current approach is important particularly when the load is non-linear and the voltage waveform, which may be more easily controlled, substantially differs from the current waveform.

DETAILED DESCRIPTION OF THE INVENTION

The present invention will hereinafter be described in detail.

Figure 3:
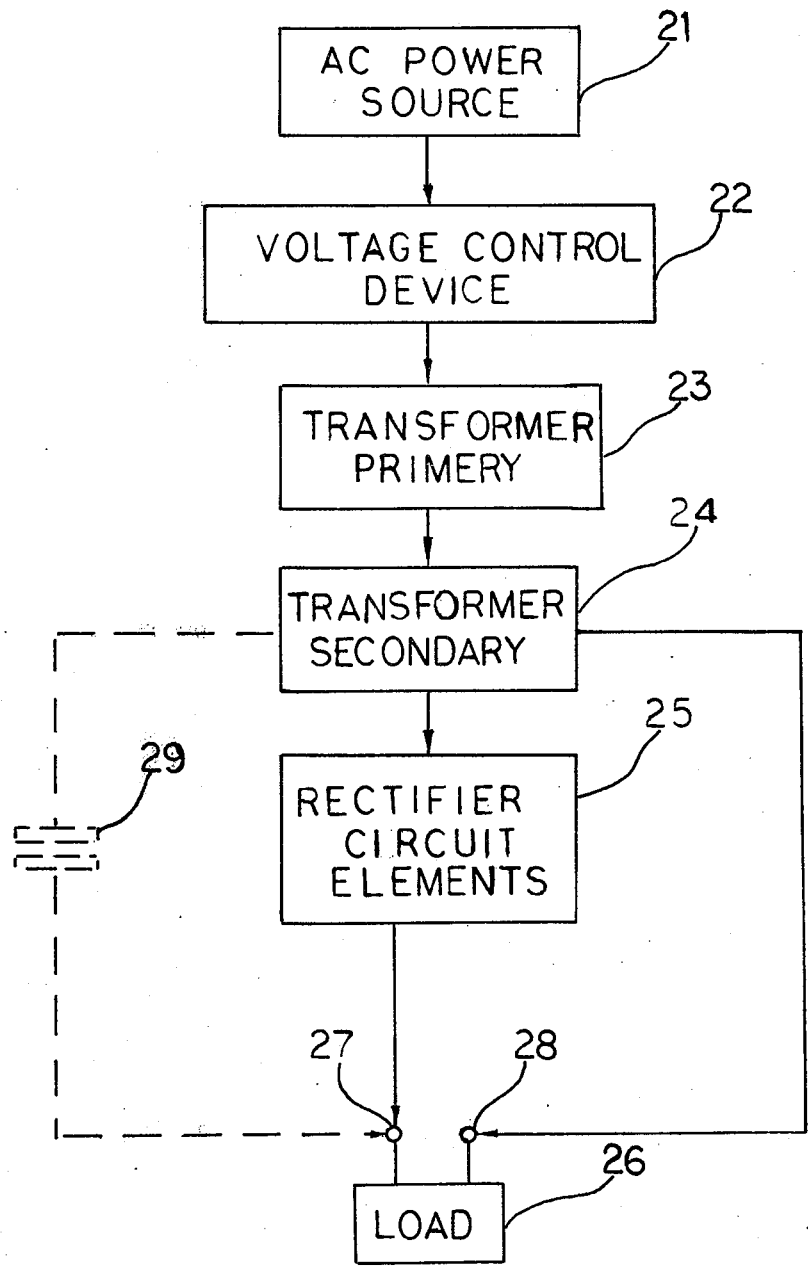
FIG. 3 is a schematic block diagram which illustrates the invented method and system for providing an AC voltage superimposed on a DC voltage across a load.

FIG. 3 illustrates one of the principles of the invention. An AC power source (21) supplies at least a single phase sine wave voltage at frequencies up to kilohertz and more but preferably at a conventional 60 Hz through a suitable voltage-control device (22) such as a saturable core reactor, semiconductor control rectifiers, or an autotransformer. If desired, the voltage-control unit may be eliminated where a constant voltage is needed at the output of the system. The primary (23) of a single phase or a multi-phase transformer is coupled with the voltage-control unit. The windings of the primary may be star-connected. The Δ-connection of windings is ordinarily preferable since it brings about a more even distribution of currents in the phases of the power supply (21). The secondary (24) of the transformer has two types of windings: ordinary and unbalancing windings. All these windings are star-connected. An ordinary winding is used exclusively for supplying AC voltage to a system (2) of rectifier circuit elements, whereas an unbalancing winding is used mainly for supplying an unbalancing AC voltage to terminals (27 and 28) of a load (26), though this winding may also be used for supplying voltage to the rectifier system. The first load terminal (27) is connected to a system of rectifier circuit elements (25) and the second load terminal (28) is directly connected to the secondary of the transformer so that a DC voltage is provided across the load. If a minimum value of AC voltage component is desired across the load, the second load terminal is connected to the point of star connection of the windings. In this case, AC potentials of the load terminals are balanced. An additional AC voltage is introduced across the load when the second load terminal is connected to different points of the unbalancing winding which provides unbalancing of AC potential of the second load terminal. The AC potential of the first load terminal (27) may be also altered with the help of a coupling capacitor (29) connected to the unbalancing winding. This capacitor affects also the waveform of the AC voltage component across the load even if it doesn't change the AC potential of the first load terminal which occurs when the second capacitor terminal is connected to the point of star-connection of transformer windings.

The schematic block diagram represented in FIG. 3 illustrates a plurality of power supplies wherein one of the load terminals (namely the second terminal) is connected directly to a transformer winding.

Figure 4:
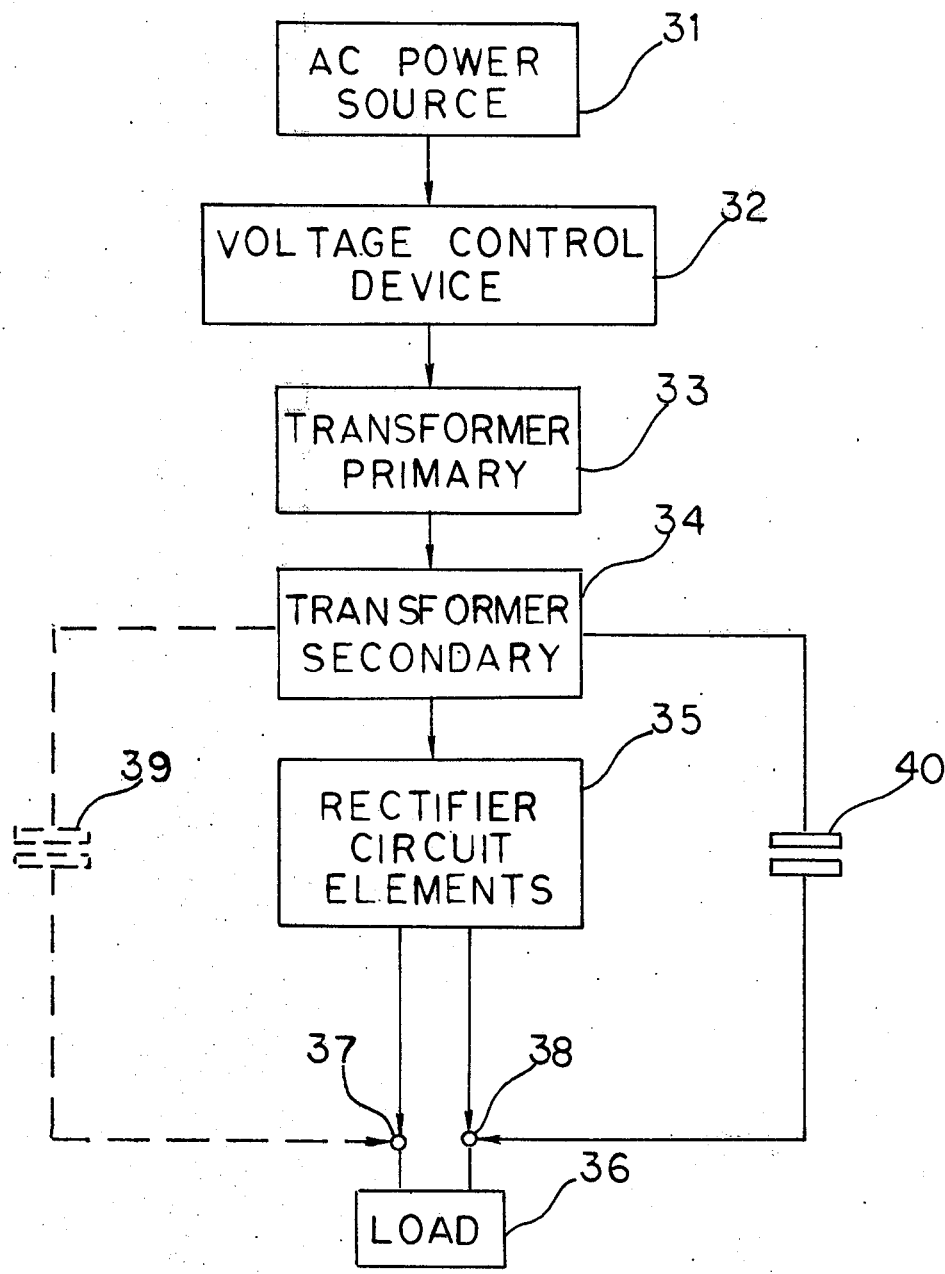
FIG. 4 is another block diagram which illustrates the invented method and system for providing an AC voltage superimposed on a DC voltage.

If both load terminals are connected to different points of a system of rectifier circuit elements, another block diagram applies. This diagram is represented in FIG. 4, and the same elements as those of FIG. 3 are used here except that two coupling capacitors (39 and 40) may be employed, one for changing AC potential of the first load terminal (37) and/or another for changing AC potential of the second load terminal. It is understood that the value of these capacitors affects the waveform of the additional AC component across the load (36).

The principles of the invention disclosed in FIG. 3 and 4 will be further illustrated by a number of preferred embodiments. These embodiments mainly differ by circuits connected to the secondary winding of the transformer.

Figure 5:
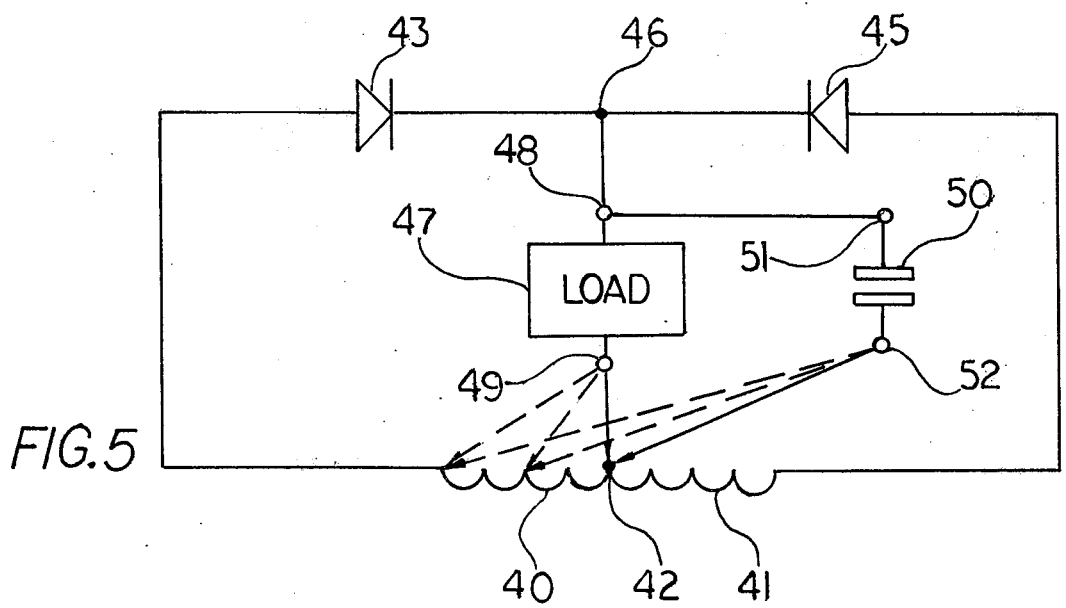
FIG. 5 shows a circuit diagram for a DC+AC power supply based on a full wave center tapped rectifier and illustrates the invented method of unbalancing AC potentials at the load terminals.
Figure 6:
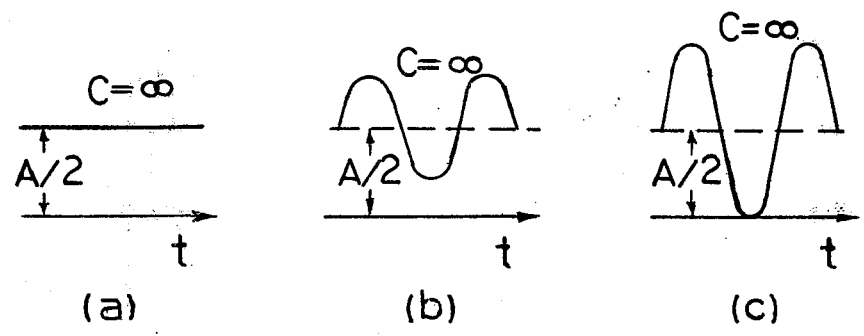
FIG. 6 is a graphic representation of different types of voltages across the load with a large capacitor (50) in the circuit of FIG. 5 connected to the center tap.

In the case of a two-phase power supply, usually known as a full-wave center tapped rectifier installation depicted in FIG. 5, a two-phase transformer secondary composed of two windings (40 and 41) with a center tap (42) is in circuit with two rectifier elements (43 and 45). These circuit elements have a common point (46) which is a first output terminal of the rectifier system. Both rectifier elements have the same direction with respect to the output terminal (46) and, of course, with respect to terminals of the transformer windings (40 and 41) to which they are connected. Under the term "rectifier circuit elements" we mean hereinafter diodes and/or thyristors. A load (47) is connected by its first terminal (48) to the first output terminal and by its second terminal (49) to the center tap (42) of the transformer secondary. A capacitor (50) with its first terminal (51) and a second terminal (52) is connected respectively to the first load terminal (48) and to the center tap (42) of the transformer. As long as the second load terminal and the second capacitor terminal are connected to the transformer center tap only, direct current with a ripple dependent on the value of the capacitor (50) will flow through the load. In this case an AC voltage component across the load is minimal and AC potentials of the load terminals may be considered as being balanced. If capacitance C of the capacitor (50) is very large (tending to infinity), a pure DC voltage with no AC component will be applied to the load (see FIG. 6a). This DC voltage is equal to a half of the amplitude A of the AC voltage across the transformer secondary which includes two windings (40 and 41).

According to this invention an additional AC voltage component will be introduced across the load (47) when the second load terminal (52) is moved from the center tap and is connected to different points along either transformer winding, whereas the second capacitor terminal is still connected to the center tap. Different positions of the second load terminal are schematically indicated by dotted arrows. When the second load terminal moves along the winding (40), AC potential of this terminal changes and becomes unbalanced with respect to the AC potential of the first load terminal. Thus, the transformer winding (40) is called "unbalancing winding". The unbalancing winding plays a dual role here: it changes the AC potential of the second load terminal and also supplies voltage to the rectifier circuit element (43). If the second load terminal (49) is connected to an intermediate point along the unbalancing winding (40) and capacitance C of the capacitor (50) is large, and also a sine wave voltage is applied to the input of the transformer, the waveform of additional component across the load is sinusoidal too. This component has an amplitude which is intermediate between zero and A/2, whereas the DC voltage is the same as it was initially, i.e., before moving the second load terminal (see FIG. 6b). When the second load terminal reaches the end of the unbalancing winding, the amplitude of the AC component equalizes with the DC voltage (see FIG. 6c).

Figure 7:
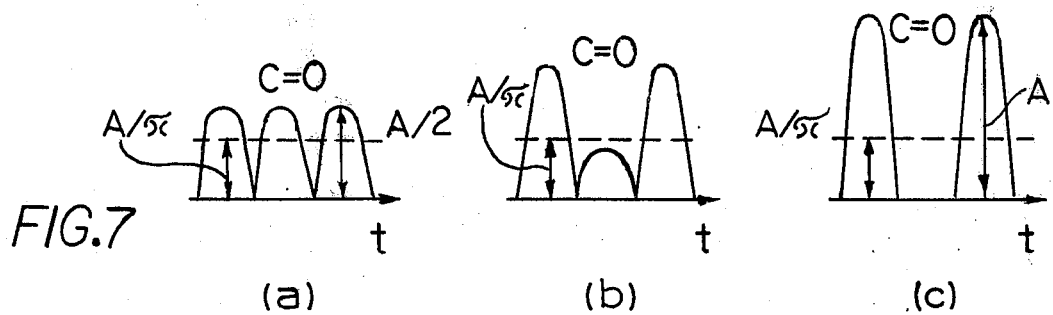
FIG. 7 is a view similar to that of FIG. 6 but with no capacitor used in the circuit.

A dramatic change of the AC component waveform will accrue from diminishing the capacitance of the capacitor (50) provided all other conditions remain unaltered. In the extreme when the capacitor (50) is disconnected (capacitance C=0), the waveform of the voltage across the load will be as depicted in FIG. 7a if the second load terminal is connected to the center tap. When this terminal is connected to an intermediate point along the unbalancing winding, the waveform is as in FIG. 7b, and, at last, as in FIG. 7c when the terminal reaches the end of the winding. It should be noted that the average value of the voltage appearing across the load remains constant for all positions of the load terminal and will be equal to $A/\pi$.

A similar effect would occur if winding (41) rather than winding (40) were used as the unbalancing winding.

So far we have discussed the method and system for unbalancing the AC potential of the second load terminal which has the reference number (49) in FIG. 5. It is also possible to unbalance the AC potential of the first load terminal (48), which may be accomplished by connecting the second capacitor terminal (52) to different points of either winding (40 or 41), leaving the second load terminal (49) connected to the center tap (42).

Figure 8:
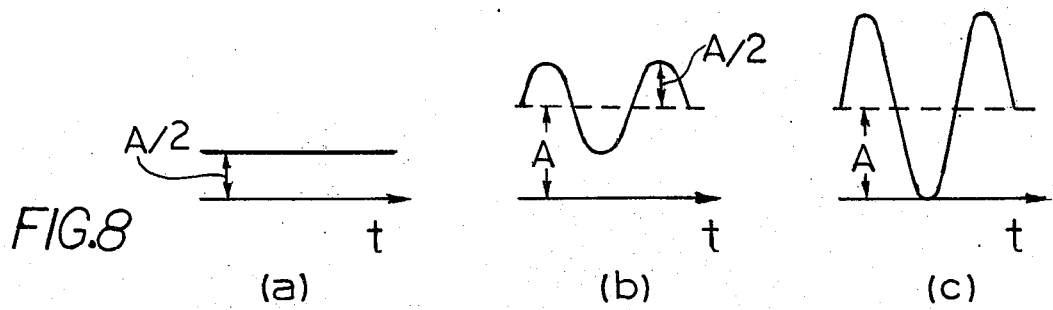
FIG. 8 is a view similar to that of FIG. 6 but with the second capacitor terminal (52) connected to different points along an unbalancing winding.

The capacitor (50) in this case will act as a coupling capacitor transferring different AC potentials along the unbalancing winding to the common point (46) of the rectifier circuit elements. Since the AC voltage difference across the rectifier elements changes, it causes a change of the DC voltage component. FIG. 8 illustrates this phenomenon. When both second load and second capacitor terminals are connected to the center tap (42), the DC component is equal to A/2 and no AC component across the load exists, provided the capacitance C is large enough (see FIG. 8a). If the second capacitor terminal (52) is connected to an intermediate point of the unbalancing winding and the load terminal (49) remains connected to the center tap (42), the DC voltage increases and a sinusoidal component appears across the load. In the extreme, when the second capacitor terminal reaches the end of the unbalancing winding, the DC component is equal to A and the amplitude of the AC component is equal to A/2 (see FIG. 8b).

It is also possible to unbalance the AC potentials of both load terminals simultaneously moving the second load and the second capacitor terminals along one or two unbalancing windings. An additional AC voltage component will appear across the load, provided the second load and capacitor terminals are not connected to the same point. In the extreme, when these terminals are connected to the opposite ends of the windings (40 and 41), the DC voltage is equal to A and the amplitude of the AC voltage component is also equal to A (see FIG. 8c). The connection of the second capacitor terminal to different points of the winding is schematically shown in FIG. 5 by dotted arrows.

It should be noted that none of the described waveforms reverse the polarity of potential across the load, a situation which may be essential for many electrochemical and other applications of the invented AC+DC power supply.

Figure 9:
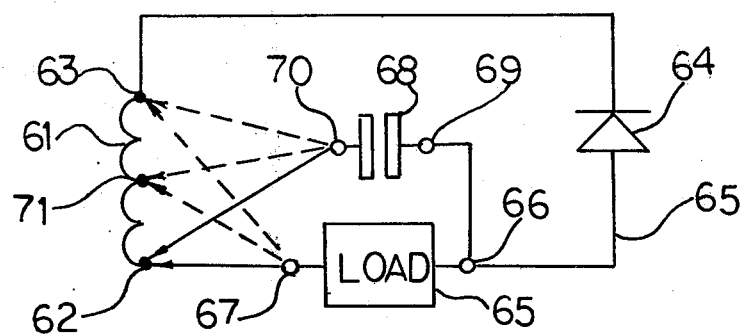
FIG. 9 shows a circuit diagram for a DC+AC power supply based on a half-wave rectifier circuit and illustrates the invented method of unbalancing AC potentials at the load terminals.

A half-wave rectifier circuit and a method represented in FIG. 9 form a special case because in this circuit sinusoidal AC component may exceed DC component across a load (65). It will happen if only AC potential of a first load terminal (66) is unbalanced, which may be accomplished by connecting a second capacitor terminal (70) to different points of an unbalancing winding (61), leaving a second load terminal (67) connected to an end (62) of the winding. A coupling capacitor (68) will transfer an AC voltage to a first load terminal (65) reducing AC voltage drop across a rectifier circuit element (64), thus resulting in diminishing the DC voltage rectified by this element. When the second load terminal reaches an end (63) of the unbalancing winding, the DC voltage across the load reduces to zero and the ratio of AC to DC components is equal to infinity.

No change of the DC component will happen if the AC potential of the second load terminal (67) is unbalanced by moving this terminal along the unbalancing winding (61) while the capacitor (68) is remaining connected to the rectifier circuit element (64) with the first capacitor terminal (69) and to the end (62) of the winding (61) with the second capacitor terminal (70). In this case the value of only AC component will change. The amplitude of this component reaches A when the second load terminal is connected to the end (63) of the unbalancing winding. The waveform of the voltage across the load (65) in this case is adequate to that of FIG. 8c which referred to the full-wave center-tapped system as depicted in FIG. 5. Moreover these two diagrams provide identical AC+DC voltages across the load not only in the previously discussed case. Identical voltages will also appear if in the circuit of FIG. 9 the second load terminal (67) is connected to the center point (71) of the winding (61) and the second capacitor terminal (70) moves along this winding in the direction of its end (62). The identity of the voltages will also occur in the opposite situation when the second capacitor terminal (70) remains connected to the point (71) and the load terminal (67) would move to the end (62).

It means that half-wave system of FIG. 9 may be represented in the majority of cases by a full-wave center-tapped system of FIG. 5 with one of two rectifier elements disconnected. Suppose the circuit element (45) is disconnected; then the ordinary phase winding (40) is used exclusively for rectification whereas the second phase winding (41) is used exclusively for unbalancing. The idea of providing a special winding which is used exclusively for unbalancing is very beneficial for multi-phase systems, as will be discussed below.

Figure 10:
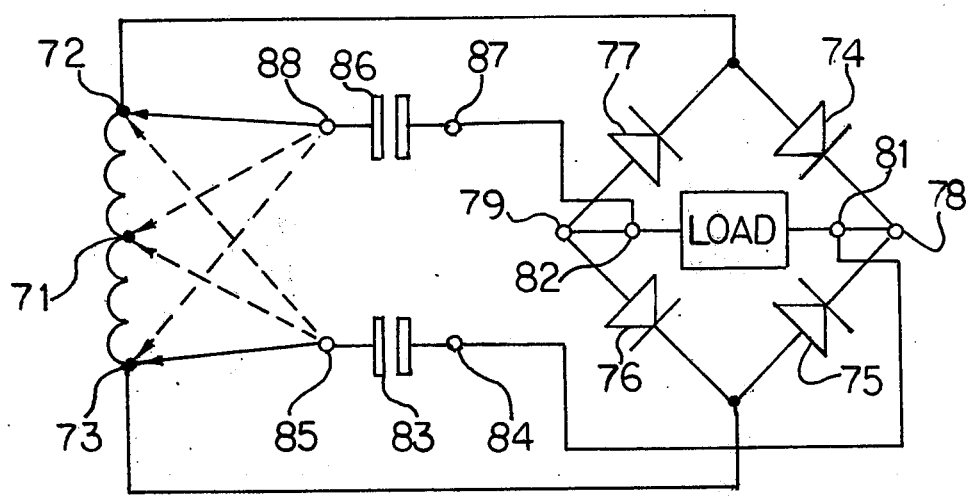
FIG. 10 shows a circuit diagram for a DC+AC power supply based on a full-wave rectifier and illustrates the invented method of unbalancing AC potentials at the load terminals.

In systems of FIG. 5 and FIG. 9 the second load terminal is connected directly to the transformer winding in compliance with the principle disclosed in FIG. 3, whereas the first load terminal is connected to at least one rectifier circuit element. According to the principle disclosed in FIG. 4, the second load terminal may also be connected to at least one rectifier circuit element which is different from the element connected to the first load terminal. This may happen, for instance, in a system which is based on a full-wave rectifier bridge represented in FIG. 10. Four rectifier circuit elements (74, 75, 76 and 77) forming a bridge rectifier circuit are connected to one-phase transformer secondary (71). Two of these elements, viz. (74) and (75), constitute a first group having a common point (78) which is a first output terminal of the rectifier system. Both these elements have the same direction with respect to this output terminal. A second group includes elements (76) and (77) having a common point (79) which is a second output terminal of the rectifier system. The elements of the second group have the same direction with respect to the second output terminal but this direction is opposite from that of the elements of the first group. Therefore, DC potentials of the first and second output terminals are of opposite polarity. A load (80) is connected with its first terminal (81) to the first output terminal and with its second terminal (82) to the second output terminal. AC potentials of load terminals are in this case balanced and an AC ripple voltage across the load is minimal. The unbalancing of AC potential of the first load terminal is accomplished with the help of a first coupling capacitor (83) connected to the first load terminal (81) with a first capacitor terminal (84) and connected to any point of the unbalancing winding (71) with a second capacitor terminal (85). The same method may be used to unbalance AC potential of the second load terminal. A second coupling capacitor (86) is used respectively for this unbalancing with its first terminal (87) connected to the second load terminal and a second capacitor terminal (88) connected to any point of the unbalancing winding albeit different from the point of connection of the terminal (85).

Figure 11:
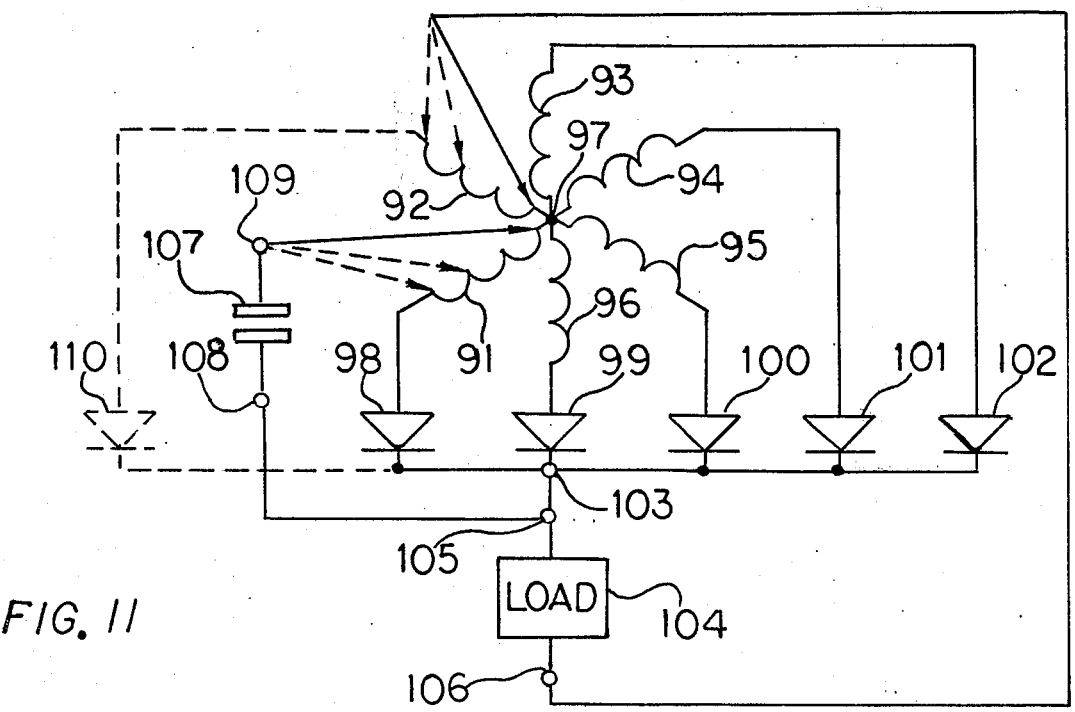
FIg. 11 shows a circuit diagram for a DC+AC power supply based on a multi-phase rectifier and illustrates the invented method method of unbalancing AC potentials of load terminals.

A multi-phase embodiment of the present invention is illustrated in FIG. 11. A secondary of the multi-phase transformer is formed by six star-connected windings with reference numbers from (91) to (96). Four of these windings, namely (93), (94), (95) and (96), are ordinary windings which are used exclusively to supply voltage to rectifier circuit elements (99), (100), (101) and (102) which have a common point (103), this point constituting the first output terminal. The remaining two windings (91 and 92) are unbalancing windings and each of them plays a dual role: it unbalances AC potential of one of the load terminals and also supplies voltage to a rectifier circuit element which is (98) for the winding (91) and (110) for the winding (92). A load (104) is connected to the first output terminal (103) with a first load terminal (105). A second load terminal (106) is connected directly to any point of the unbalancing winding (92), thus introducing an additional AC voltage component across the load. Evidently, no additional voltage will be introduced if the second load terminal is connected to a point (97) of star connection of the windings. The unbalancing of AC potential of the first load terminal (105) is accomplished in the manner described in previous embodiments: a coupling capacitor (107) is used, this capacitor being connected to the first load terminal with a first capacitor terminal (108) and to the unbalancing winding (91) with its second terminal (109). It should be pointed out that the use of a special unbalancing winding (91) for changing AC potential of the first load terminal is gratuitous. In this case the same unbalancing winding (92) which is employed for changing AC potential of the second load terminal may be used. It is evident that if the second capacitor terminal (109) is connected to the point (97) of star connection of the windings, no unbalancing of the first load terminal will occur. But the role of the capacitor (107) is still important here since it essentially affects the waveform of the AC component across the load, this component being introduced by connecting the second load terminal (106) to different points along the unbalancing winding. If the windings of the transformer secondary provide sine form voltage and the capacitor (107) is large enough, i.e., it has a large capacitance C, the waveform of the AC component across the load is sinusoidal too. Being connected to the point (97) of star-connection, the coupling capacitor (107) becomes a wave shape forming only. As such, it has a minimal AC voltage drop and gives the advantage of employing the least expensive electrolytic type capacitors which cannot be otherwise employed as coupling capacitors when a substantial AC voltage is applied across their terminals.

It is not crucial for the unbalancing winding to supply a voltage for a rectifying system along with supplying the unbalancing voltage. The last function of the winding may be the only one. In this case the rectifier circuit element (110), which is shown by dotted lines in FIG. 11, is disconnected.

Figure 12:
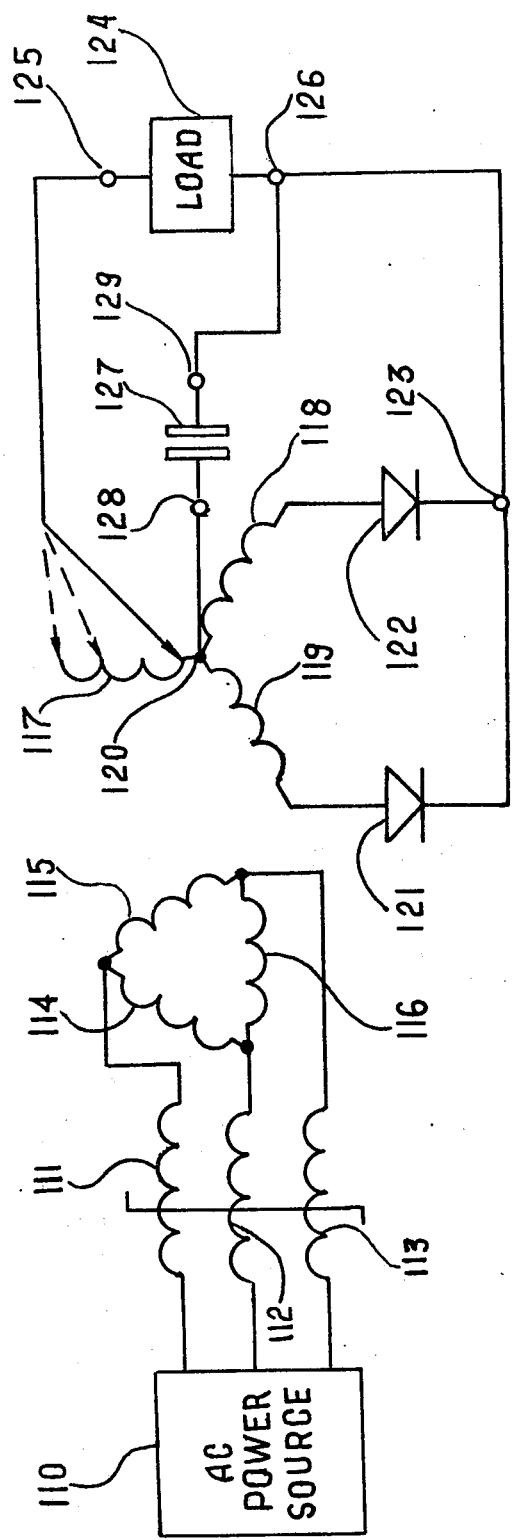
FIG. 12 shows a circuit diagram of a DC+AC power supply based on a three-phase rectifier and illustrates the invented method of unbalancing AC potentials of load terminals.

Another preferred embodiment of the present invention, which is depicted in FIG. 12, is a particular case of the just now described multi-phase system. It is a three-phase system where a sine form voltage of industrial frequency, predominantly of 60 or 50 cycles per second, is applied from a source (110) to a transformer primary through a voltage-control system which here is a saturable core reactor with three windings (111), (112) and (113).

The three-phase transformer primary consists of three Δ-connected windings (114), (115) and (116). The Δ-connection is preferable since the source appears to be more evenly current loaded therein. Still, a Y-connection may also be employed here. A saturable core reactor is purposely chosen in this system for voltage control to provide the following two additional functions: it assists in equalizing line currents and also changes the sine form voltage at the input into non-sinusoidal waveform at the output of the reactor to secure a non-sinusoidal waveform of voltage component across a load. This waveform is very important in some applications, for instance when the load is an aluminum anodizing installation. Of course, other types of voltage control, such as an autotransformer or semiconductor control rectifiers, may be used too. An autotransformer would not change the waveform of the controlled voltage, whereas semiconductor control rectifiers do change this waveform but would not provide the same equalizing effect for the line currents as the saturable core reactor does. Three phase windings of the transformer secondary, namely (117), (118) and (119), are star connected in a point (120). Windings (118) and (119) are ordinary windings and are used exclusively for supplying voltage to rectifier circuit elements (121) and (122), both elements being connected to a common point (123) and having the same direction with respect to this point. The winding (117) is an unbalancing winding and is used here exclusively for supplying voltage to change AC potential of a second terminal (125) of a load (124) which is connected to the first output terminal (123) with its first terminal (126).

The unbalancing of the second load terminal is accomplished by connecting this terminal to different points of the unbalancing winding (117) which is indicated schematically in FIG. 12 by several dotted arrows. A capacitor (127) is connected to the first load terminal with a first capacitor terminal (129) and to the point of star connection (120) with the second capacitor terminal (128). An electrolytic capacitor or a plurality of capacitors connected in parallel may be used as a capacitor (127). The higher the capacitance of this capacitor, the closer to a sinusoide will be the waveform of AC component across the load, provided the sine voltage is applied to the secondary windings of the transformer. Disconnecting the capacitor or diminishing its value would greatly affect the waveform of the AC component unless the load itself has capacitance reaction and the capacitance of the load is high enough.

The last two embodiments of FIG. 11 and FIG. 12 represent a multi-phase system implemented in compliance with principles of the block diagram in FIG. 3, where one of the load terminals is directly connected to a winding of the transformer secondary and the other load terminal is connected to at least one rectifier circuit element. A multi-phase bridge rectifier system known to the skilled in the art may also be employed for a DC+AC power supply. In this system both load terminals are connected to different groups of rectifier circuit elements according to principles of the block diagram in FIG. 4, and AC potentials of load terminals are altered in this case with the help of coupling capacitors. A Δ-connection instead of a Y-connection of windings of the transformer secondary may be used in this system.

Although certain embodiments of the invention have been shown in the drawings and described in the specification, it is to be understood that the invention is not limited thereto, is capable of modification, and can be arranged without departing from the spirit and scope of the invention.

We claim:

1. A DC+AC power supply comprising:
(a) a transformer having at least two star-connected phase windings in the secondary, at least one of these windings being an ordinary winding used exclusively for supplying an AC voltage to a rectifier system, and at least one of these windings being an unbalancing winding used for supplying AC voltage to a rectifier system and also for providing an additional AC voltage component across a load;
(b) a rectifier system having at least two rectifier circuit elements, each circuit element having two terminals, one terminal being connected to any phase-winding of the secondary of the transformer, the other terminal being connected to a first output terminal, all rectifier circuit elements having the same direction with respect to said first output terminal, whereby each of the phase-windings is connected to a corresponding rectifier circuit element;
(c) a load having a first and a second terminal, the first load terminal being connected to the first output terminal, and the second load terminal being connected to any point of the unbalancing winding, said point being different from the point of star connection of transformer windings, whereby an additional AC voltage component is introduced across the load, said AC voltage being superimposed on a DC voltage across said load.

2. A DC+AC power supply of claim 1 further comprising:
(d) at least one capacitor, each capacitor having a first and a second terminal, the first capacitor terminal being connected to the first load terminal and the second capacitor terminal being connected to the point of star connection of transformer windings, said capacitor being used for changing a waveform of the AC voltage component across the load.

3. A DC+AC power supply of claim 2 further comprising:
(e) means for voltage control coupled with a primary of the transformer, said means including a saturable core reactor.

4. A DC+AC power supply comprising:
(a) a transformer having at least three star connected phase-windings in the secondary, at least two of these windings being ordinarily windings used exclusively for supplying an AC voltage to a rectifier system, and at least one of these windings being an unbalancing winding used for conducting a DC current to a load and also for providing an additional AC voltage component across the load;

(b) a rectifier system, having at least two rectifier circuit elements, each circuit element having two terminals, one terminal being connected to any ordinary phase-winding of the secondary of the transformer, the other terminal being connected to a first output terminal, all rectifier circuit elements having the same direction with respect to said first output terminal, whereby each of the phase-windings except unbalancing winding is connected to a corresponding rectifier circuit element;

(c) a load having a first and a second terminal, the first load terminal being connected to the first output terminal, and the second load terminal being connected to any point of the unbalancing winding, said point being different from the point of star connection of the transformer windings, whereby an additional AC voltage component is introduced across the load.

5. A DC+AC power supply of claim 4 further comprising:

(d) at least one capacitor, each capacitor having a first and a second terminal, the first capacitor terminal being connected to the first load terminal, and the second capacitor terminal being connected to the point of star connection of transformer windings, said capacitor being used for changing the waveform of the AC voltage component across the load.

6. A DC+AC power supply of claim 5 further comprising:

(e) means for voltage control coupled with a primary of the transformer, said means including a saturable core reactor.

7. A DC+AC power supply comprising:

(a) a transformer with at least one phase-winding in the secondary, each phase winding being an unbalancing winding used for supplying AC voltage to a rectifier system and also for providing an additional AC voltage component across a load;

(b) a rectifier system having at least two rectifier circuit elements, each circuit element having two terminals, one terminal being connected to any unbalancing phase-winding of the transformer, the other terminal being connected to a first output terminal, said two rectifier circuit elements having the same direction in respect to said first output terminal, whereby each of the unbalancing windings is connected to a corresponding rectifier circuit element;

(c) a load having a first and a second terminal, the first load terminal being connected to the first output terminal, and the second load terminal being connected to any point of any unbalancing winding, whereby an additional AC voltage component is introduced across the load;

(d) at least one capacitor, each capacitor having a first and a second terminal, the first capacitor terminal being connected to the first load terminal, and the second capacitor terminal being connected to any point of any unbalancing winding, except the point to which the second load terminal is connected, whereby an additional AC voltage component is introduced across the load.

8. A DC+AC power supply comprising:

(a) a transformer with one phase-winding in the secondary, said winding being an unbalancing winding used for supplying AC voltage to a rectifier system and also for providing an additional AC voltage component across a load;

(b) a rectifier system, having at least one rectifier circuit element, each circuit element having two terminals, one terminal being connected to the unbalancing phase-winding of the transformer, the other terminal being connected to a first output terminal, all rectifier circuit elements having the same direction in respect to said first output terminal;

(c) a load having a first and a second terminal, the first load terminal being connected to the first output terminal, and the second load terminal being connected to any point of the unbalancing winding;

(d) at least one capacitor, each capacitor having a first and a second terminal, the first capacitor terminal being connected to the first load terminal, and the second capacitor terminal being connected to any point of the unbalancing winding, except that the point to which the second load terminal is connected, whereby an additional AC voltage component is introduced across the load.

9. A DC+AC power supply comprising:

(a) a transformer with at least one phase-winding in the secondary, each phase-winding being an unbalancing winding used for supplying AC voltage to a rectifier system and also for providing an additional AC voltage component across a load;

(b) a rectifier system, having two groups of rectifier circuit elements, the first group consisting of at least one rectifier circuit element, each circuit element having two terminals, one terminal being connected to any unbalancing winding, the other terminal being connected to a first output terminal, all rectifier circuit elements of this group having the same direction in respect to the terminals of the windings to which they are connected, the second group consisting of at least rectifier circuit elements, each circuit element having two terminals, one of said terminals being connected to any unbalancing winding, the other terminal being connected to a second output terminal, so that each end terminal of the transformer windings is connected to a corresponding rectifier circuit element of the second group, all rectifier circuit elements of the second group having the same direction in respect to the terminals of the windings to which they are connected, the direction of rectifier circuit elements of the second group being opposite from the description of the first group circuit elements, whereby DC potentials of opposite polarity are provided to the first and second output terminals respectively;

(c) a load having a first and a second terminal, the first load terminal being connected to the first output terminal, the second load terminal being connected to the second output terminal;

(d) at least one first capacitor, each capacitor having a first and a second terminal, the first capacitor terminal being connected to the first load terminal, and the second capacitor terminal being connected to any point of any unbalancing transformer winding, whereby an additional AC component is introduced across the load.

10. A DC+AC power supply of claim 9 further comprising:

(e) at least one second capacitor, each capacitor having a first and a second terminal, the first capacitor terminal being connected to the second load terminal, and the second capacitor terminal being connected to any point of any unbalancing transformer winding except the point to which the second capacitor terminal of the first capacitors is connected, whereby an additional AC component is introduced across the load;

11. A method for providing an AC voltage superimposed on a DC voltage, the method comprising the steps of:
   (a) supplying an at least one-phase voltage to a modifying transformer with star-connected phase windings in the secondary;
   (b) modifying said AC voltage into a first and a second voltage with the help of said transformer, the first voltage being an at least one-phase voltage and being created with the help of at least one ordinary winding of the secondary of said transformer, said first AC voltage being used for supplying an AC current to a system of rectifier circuit elements, the second voltage being an unbalancing voltage and being created by one of the ordinary phase windings which is also an unbalancing winding, said second voltage being used for changing the AC potential of one terminal of a load;
   (c) rectifying said first voltage with the help of rectifying circuit elements for providing a rectified voltage across the load;
   (d) coupling a first load terminal with rectifier circuit elements and a second load terminal with a point of star-connection of the secondary of the transformer, whereby a DC voltage with a minimum AC ripple voltage is introduced across the load;
   (d) changing the AC potential of the second load terminal by connecting said terminal to any point of the unbalancing winding whereby an additional AC voltage superimposed on the DC voltage is introduced across the load, said AC voltage being changed as the second load terminal is connected to different points along the unbalancing winding;

12. The method as defined by claim 11, which further comprises the step of coupling terminals of at least one capacitor with the transformer and rectifier circuit elements, so that one capacitor terminal is connected to the point of star connection of the transformer secondary, and the other terminal is connected to the same point of the rectifier system to which the first load terminal is connected, whereby the waveform of the AC component across the load is changed as capacitance of the capacitor increases.

13. A method for providing an AC voltage superimposed on DC voltage, the method comprising the steps of:
   (a) supplying an at least one-phase AC voltage to a modifying transformer with star-connected phase windings in the secondary;
   (b) modifying said AC voltage into a first and a second voltage with the help of said transformer, the first voltage being an at least one-phase voltage and being created with the help of at least one ordinary winding of the secondary of said transformer, said first AC voltage being used for supplying an AC current to a system of rectifier circuit elements, the second voltage being an unbalancing voltage and being created by one of the phase-windings of the secondary which is an unbalancing winding, the second voltage being used for changing the AC potential of one terminal of a load;
   (c) rectifying said first voltage with the help of rectifying circuit elements for providing a rectified voltage across the load;
   (d) coupling a first load terminal with rectifier circuit elements and a second load terminal with a point of star connection of the secondary of the transformer, whereby a DC voltage with a minimum AC ripple voltage is introduced across the load;
   (e) changing the AC potential of the second load terminal by connecting said terminal to any point of the unbalancing winding thereby an additional AC voltage superimposed on the DC voltage is introduced across the load, said AC voltage being changed as the second load terminal is connected to different points along the unbalancing winding.

14. The method as defined by claim 1, which further comprises the step of coupling terminals of at least one capacitor with the transformer and rectifier circuit elements, so that one capacitor terminal is connected to the point of star connection of the transformer secondary, and the other terminal is connected to the same point of the rectifier system to which the first load terminal is connected, whereby the waveform of the AC component across the load is changed as capacitance of the capacitor increases.

15. A method for providing an AC voltage superimposed on a DC voltage, the method comprising the steps of:
   (a) supplying an at least one-phase sinusoidal AC voltage to a saturable core reactor;
   (b) modifying said sinusoidal voltage into non-sinusoidal voltage with the help of said reactor and also controlling the value of said non-sinusoidal voltage by said reactor;
   (c) supplying said non-sinusoidal voltage to a modifying transformer with star-connected phase-windings in the secondary;
   (d) modifying said AC voltage into a first and a second voltage with the help of said transformer, the first voltage being an at least one-phase voltage, and being created with the help of at least one ordinary winding of the secondary of said transformer, said first AC voltage being used exclusively for supplying an AC current to a system of rectifier circuit elements, the second voltage being an unbalancing voltage and being created by one of the phase windings of the secondary which is an unbalancing winding, the second voltage being used for changing the AC potential of one terminal of a load;
   (e) rectifying said first voltage with the help of rectifying circuit elements for providing a rectified voltage across the load;
   (f) coupling a first load terminal with rectifier circuit elements and a second load terminal with a point of star connection of the secondary of the transformer, whereby a DC voltage with a minimum AC ripple voltage is introduced across the load;
   (g) changing the AC potential of the second load terminal by connecting said terminal to any point of the unbalancing winding whereby an additional AC voltage superimposed on the DC voltage is introduced across the load, said AC voltage being changed as the second load terminal is connected to different points along the unbalancing winding;
   (h) coupling terminals of at least one capacitor with the transformer and rectifier circuit elements, so that one capacitor terminal is connected to the point of star connection of the transformer secondary, and the other terminal is connected to the same point of the rectifier system to which the first load terminal is connected, whereby the waveform of the AC component across the load is changed as capacitance of the capacitor increases.

16. A method for comprising the steps of:
(a) supplying an at least one-phase AC voltage to a modifying transformer with star connected phase windings in the secondary;
(b) modifying said AC voltage into a first, a second and a third voltage with the help of said transformer, the first voltage being an at least one-phase voltage and being created with the help of at least one ordinary winding of the secondary of said transformer, said first AC voltage being used for supplying an AC current to a system of rectifier circuit elements, the second voltage being an unbalancing voltage and being created by one of the ordinary phase windings which is also an unbalancing winding, the second voltage being used for changing the AC potential of one terminal of a load, the third voltage being another unbalancing voltage and being created by one of the ordinary phase windings which is also an unbalancing winding, the third voltage being used for changing the AC potential of the other terminal of the load;
(c) rectifying said first voltage with the help of rectifying circuit elements for providing a rectified voltage across the load;
(d) coupling a first load terminal with rectifier circuit elements and a second load terminal with a point of star connection of the secondary of the transformer, whereby a DC voltage with a minimal AC ripple voltage is introduced across the load;
(e) changing the AC potential of the second load terminal by connecting said terminal to any point of the unbalancing winding, whereby an additional AC voltage superimposed on the DC voltage is introduced across the load, said AC voltage being changed as the second load terminal is connected to different points along the unbalancing winding;
(f) changing the AC potential of the first load terminal by connecting one terminal of at least one capacitor to said first load terminal and connecting another capacitor terminal to any point of the unbalancing winding, this point being different from the point of connection of the second load terminal, whereby an additional AC voltage superimposed on the DC voltage is introduced across the load, said AC voltage being altered while said other capacitor terminal is connected to different points along the unbalancing winding.

17. A method for providing an AC voltage superimposed on a DC voltage, the method comprising the steps of:
(a) supplying an at least one-phase AC voltage to a modifying transformer with electrically connected phase-windings in the secondary;
(b) modifying said AC voltage into a first and a second voltage with the help of said transformer, the first voltage being an at least one-phase voltage and being created with the help of at least one ordinary winding of the secondary of said transformer, said first AC voltage being used for supplying an AC current to a system of rectifier circuit elements, the second voltage being an unbalancing voltage and being created by one of the ordinary windings which is also an unbalancing winding, the second voltage being used for changing the AC potential of one terminal of a load;
(c) rectifying said first voltage with the help of rectifying circuit elements for providing a rectified voltage across the load;
(d) coupling a first and a second load terminal with the system of rectifying circuit elements so that a DC voltage with a minimal AC ripple voltage is introduced across the load;
(e) changing the AC potential of the first load terminal using at least one capacitor connected to the first load terminal with one capacitor terminal and to any point of the unbalancing winding with the other capacitor terminal, whereby an additional AC voltage superimposed on the DC voltage is introduced across the load, said AC voltage changing while said other capacitor terminal is connected to different points of the unbalancing winding.

* * * * *

UNITED STATES PATENT OFFICE
CERTIFICATE OF CORRECTION

Patent No. 4,170,739         Dated  October 9, 1979

Inventor(s) Boruch B. Frusztajer and Moisey M. Lerner

It is certified that error appears in the above-identified patent and that said Letters Patent are hereby corrected as shown below:

```
Column 1, line 23, change "a" to --the--
       1, line 26, change "3" to --2--
       1, line 29, change "unwidely" to --unwieldly--
       1, line 33, change "largely" to --large--
       1, line 36, change "a" to --the--
Column 2, line 53, after "have" add --an--
       2, line 64, after "changing" add --the--
Column 3, line 35, before "capacitors" add --the--
       3, line 54, change "circuit" to --current--
Column 4, line 63, after "changing" add --the--
       4, line 65, before "AC" insert --the--
Column 5, line 2, before "4" insert --FIG.--
       5, line 28, change "an" to --the--
       5, line 29, before "AC" insert --the--
       5, line 45, before "AC" insert --the--
       5, line 48, after "called" add --the--
       5, line 56, before "additional" add --the--
Column 6, line 61, after "circuit" add --the--
       6, line 61, after "exceed" add -the--
       6, line 62, after "only" add --the--
Column 7, line 1, after "reducing" add --the--
       7, line 11, change "is remaining" to --remains--
       7, line 15, after "only" add --the--
       7, line 19, change "adequate" to --similar--
       7, line 32, after "that" add --the--
       7, line 33, change "a" to --the--
       7, line 34, before "two" insert --the--
       7, line 42, after "In" add --the--
       7, line 51, change "a" to --the--
       7, line 56, change "a" to --the--
       7, line 60, change "is a" to --is the--
       7, line 65, before "DC" insert --the--
```

UNITED STATES PATENT OFFICE
CERTIFICATE OF CORRECTION

Page 2 of 3

Patent No. 4,170,739     Dated  October 9, 1979

Inventor(s) Boruch B. Frusztajer and Moisey M. Lerner

It is certified that error appears in the above-identified patent and that said Letters Patent are hereby corrected as shown below:

Column 8, line 1, before "AC" insert --The--
        8, line 1, after "of" add --the--
        8, line 2, change "an" to --the--
        8, line 3, before "AC" insert --the--
        8, line 9, after "unbalance" add --the--
        8, line 26, before "AC" insert --the--
        8, line 34, change "Evidently" to --Obviously--
        8, line 36, change "a" to --the--
        8, line 37, before "AC" insert --the--
        8, line 44, before "AC" insert --the--
        8, line 47, before "AC" insert --the--
        8, line 61, change "becomes" to --serves--
        8, line 62, after "forming" add --function--
        8, line 66, change "for a" to --for the--
Column 9, line 22, after "into" add --a--
        9, line 24, change "secure" to --provide--
        9, line 24, before "voltage" insert --the--
        9, line 36, change "in" to --at--
        9, line 43, before "AC" insert --the--
        9, line 57, change "sinusoide" to --sinusoid--
        9, line 58, before "AC" insert --the--
        9, line 62, change "capacitance" to --capacitive--
        9, line 63, change "reaction" to --reactance--

UNITED STATES PATENT OFFICE
CERTIFICATE OF CORRECTION

Patent No. 4,170,739　　　　　　　Dated October 9, 1979

Inventor(s) Boruch B. Frusztajer and Moisey M. Lerner

It is certified that error appears in the above-identified patent and that said Letters Patent are hereby corrected as shown below:

Column 10, line 7, before "AC" insert --the--
　　　　10, line 7, before "load" insert --the--
　　　　10, line 53, change "a" to --the--

Signed and Sealed this

Thirteenth Day of May 1980

[SEAL]

Attest:

SIDNEY A. DIAMOND

*Attesting Officer*　　*Commissioner of Patents and Trademarks*